(12) United States Patent
Schmaling et al.

(10) Patent No.: US 10,858,096 B1
(45) Date of Patent: Dec. 8, 2020

(54) FOLDING HORN CONCEPT FOR RIGID ROTOR BLADE FOLD

(71) Applicant: LOCKHEED MARTIN CORPORATION, Bethesda, MD (US)

(72) Inventors: David N. Schmaling, Southbury, CT (US); David H. Hunter, Cheshire, CT (US); Andrew C. Goodwin, Shelton, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 9 days.

(21) Appl. No.: 16/425,643

(22) Filed: May 29, 2019

(51) Int. Cl.
*B64C 27/80* (2006.01)
*B64C 27/48* (2006.01)
*B64C 27/10* (2006.01)

(52) U.S. Cl.
CPC .............. *B64C 27/80* (2013.01); *B64C 27/10* (2013.01); *B64C 27/48* (2013.01)

(58) Field of Classification Search
None
See application file for complete search history.

(56) References Cited

U.S. PATENT DOCUMENTS

| | | | | |
|---|---|---|---|---|
| 3,782,854 A * | 1/1974 | Rybicki | ................. | B64C 27/32 416/134 R |
| 4,087,203 A * | 5/1978 | Ferris | ...................... | B64C 27/35 416/141 |
| 4,131,391 A * | 12/1978 | Robinson | ................ | B64C 27/43 416/140 |
| 4,349,316 A * | 9/1982 | Hughes | .................... | B64C 27/82 416/104 |
| 4,439,106 A * | 3/1984 | Ferris | ...................... | B64C 27/48 416/134 A |
| 4,555,219 A * | 11/1985 | Jeffery | .................... | B64C 27/24 416/155 |
| 5,263,821 A * | 11/1993 | Noehren | ................. | B64C 27/33 415/115 |
| 5,267,833 A * | 12/1993 | Mouille | .................. | B64C 27/32 416/106 |
| 5,304,036 A * | 4/1994 | Groen | ..................... | B64C 27/43 244/17.25 |
| 5,322,415 A | 6/1994 | White et al. | | |
| 5,738,494 A * | 4/1998 | Schmaling | .............. | B64C 27/33 416/134 A |
| 7,530,790 B2 | 5/2009 | Cabrera et al. | | |
| 2003/0223871 A1* | 12/2003 | Schmaling | .............. | B64C 27/35 416/107 |
| 2007/0128037 A1* | 6/2007 | Schmaling | ............ | B64C 27/605 416/134 A |
| 2008/0112808 A1* | 5/2008 | Schmaling | .............. | B64C 27/10 416/134 A |

(Continued)

Primary Examiner — Michael Lebentritt
(74) Attorney, Agent, or Firm — Foley & Lardner LLP

(57) ABSTRACT

A rotor blade assembly of an aircraft. The rotor blade assembly includes a blade attachment assembly rotatable with respect to a rotor hub assembly of the aircraft about a blade fold axis, and a pitch control assembly. The pitch control assembly includes a horn mount attachable to the rotor hub assembly, and a teeter bar hingedly attached to the horn mount at an interface, the interface defining a pitch control fold axis. The pitch control assembly is foldable about the pitch control fold axis when the pitch control fold axis is aligned with the blade fold axis.

19 Claims, 11 Drawing Sheets

(56) References Cited

U.S. PATENT DOCUMENTS

| | | | |
|---|---|---|---|
| 2008/0131280 A1* | 6/2008 | Krauss | B64C 27/50 416/131 |
| 2009/0097973 A1* | 4/2009 | Cabrera | B64C 27/50 416/1 |
| 2013/0149151 A1* | 6/2013 | Rauber | B64C 27/43 416/141 |
| 2014/0047690 A1* | 2/2014 | Plantan | F16D 65/095 29/407.09 |
| 2014/0226926 A1* | 8/2014 | Caruso | F16F 1/3935 384/125 |
| 2014/0271180 A1* | 9/2014 | Haldeman | B64C 27/52 416/1 |
| 2016/0059960 A1* | 3/2016 | Fearn | B64C 27/022 244/17.11 |
| 2018/0186447 A1* | 7/2018 | Miller | B64C 27/51 |
| 2018/0273160 A1* | 9/2018 | Baldwin | B64C 11/008 |
| 2019/0009898 A1* | 1/2019 | Bosworth | B64C 27/605 |
| 2019/0017543 A1* | 1/2019 | Shimek | B64C 27/35 |
| 2019/0023387 A1* | 1/2019 | Davis | B64C 11/301 |
| 2019/0031328 A1* | 1/2019 | McCullough | B64C 27/35 |

* cited by examiner

FOLDING HORN CONCEPT FOR RIGID ROTOR BLADE FOLD

BACKGROUND

The embodiments disclosed herein relate to a rotor assembly of a rotary wing aircraft, and more particularly to a pitch control system operable to fold about a blade fold axis of the blade assembly.

Flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. Such folding breaks a mechanical link between a pitch control system of a rotor hub of the aircraft and a pitch control coupling of a rotor blade assembly. When the rotor blade assembly is unfolded back into place, additional bolting and mechanical connecting of the pitch control system to the pitch control coupling of the rotor blade assembly is required before the aircraft can be used. These additional connecting steps are difficult and time-consuming.

BRIEF DESCRIPTION

According to an embodiment, a rotor blade assembly of an aircraft is disclosed. The rotor blade assembly includes a blade attachment assembly rotatable with respect to a rotor hub assembly of the aircraft about a blade fold axis, and a pitch control assembly. The pitch control assembly includes a horn mount attachable to the rotor hub assembly, and a teeter bar hingedly attached to the horn mount at an interface, the interface defining a pitch control fold axis; wherein the pitch control assembly is foldable about the pitch control fold axis when the pitch control fold axis is aligned with the blade fold axis.

In addition to one or more of the features described above, or as an alternative, the pitch control assembly is foldable about the pitch control fold axis when the pitch control fold axis is collinear with the blade fold axis.

In addition to one or more of the features described above, or as an alternative, the pitch control assembly is foldable by rotating the teeter bar with respect to the horn mount about the pitch control fold axis.

In addition to one or more of the features described above, or as an alternative, the horn mount and the teeter bar remain coupled when the rotor blade assembly is folded.

In addition to one or more of the features described above, or as an alternative, the blade attachment assembly and pitch control assembly rotate through the same angle to fold the rotor blade assembly.

In addition to one or more of the features described above, or as an alternative, the pitch control assembly is rotatable about a pitch control axis to align the pitch control fold axis with the blade fold axis.

In addition to one or more of the features described above, or as an alternative, the interface includes a clevis of the teeter bar coupled to a tang of the horn mount.

In addition to one or more of the features described above, or as an alternative, the teeter bar includes a horn extender coupled to an outboard portion, the horn extender including the clevis.

In addition to one or more of the features describe above, or as an alternative, the pitch control assembly further includes a bearing, and the horn extender coupling to the outboard portion via a connector that extends from the horn extender through a central opening of the bearing.

According to another embodiment, a pitch control assembly for a rotor blade assembly of an aircraft is disclosed. The pitch control assembly includes a horn mount attachable to a rotor hub assembly of the aircraft, wherein the rotor blade assembly is rotatable with respect to the rotor hub assembly at a blade fold axis, and a teeter bar hingedly attached to the horn mount at an interface, the interface defining a pitch control fold axis; wherein the pitch control assembly is foldable about the pitch control fold axis when the pitch control fold axis is aligned with the blade fold axis.

In addition to one or more of the features described above, or as an alternative, the pitch control assembly is foldable about the pitch control fold axis when the pitch control fold axis is collinear with the blade fold axis.

In addition to one or more of the features described above, or as an alternative, the pitch control assembly is foldable by rotating the teeter bar with respect to the horn mount about the pitch control fold axis.

In addition to one or more of the features described above, or as an alternative, the horn mount and the teeter bar remain coupled when the blade is folded.

In addition to one or more of the features described above, or as an alternative, the pitch control assembly is rotatable about a pitch control axis to align the pitch control fold axis with the blade fold axis.

In addition to one or more of the features described above, or as an alternative, the interface includes a clevis of the teeter bar coupled to a tang of the horn mount.

In addition to one or more of the features described above, or as an alternative, the teeter bar includes a horn extender coupled to an outboard portion, the horn extender including the clevis.

In addition to one or more of the features described above, or as an alternative, the pitch control assembly further includes a bearing, wherein the horn extender couples to the outboard portion via a connector that extends from the horn extender through a central opening of the bearing.

In addition to one or more of the features described above, or as an alternative, the outboard portion is mechanically coupled to a blade attachment assembly to control a pitch of a rotor blade.

In addition to one or more of the features described above, or as an alternative, a coaxial aircraft includes the rotor blade assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
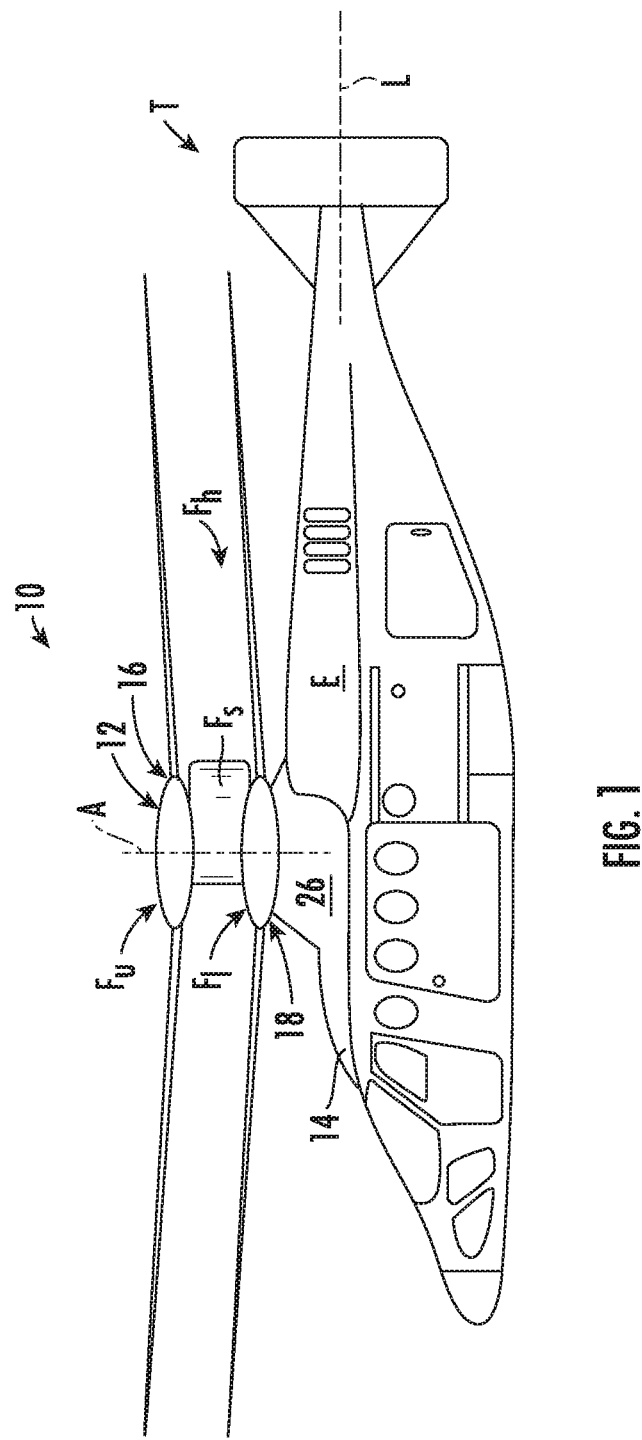
FIG. 1 is a perspective view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention.

A main gearbox 26, which may be located above the aircraft cabin, drives the coaxial rotor system 12. The translational thrust system T may be driven by the same main gearbox 26 which drives the coaxial rotor system 12. The main gearbox 26 is driven by one or more engines (illustrated schematically at E). As shown, the main gearbox 26 may be interposed between the gas turbine engines E, the coaxial rotor system 12 and the translational thrust system T.

Figure 2:
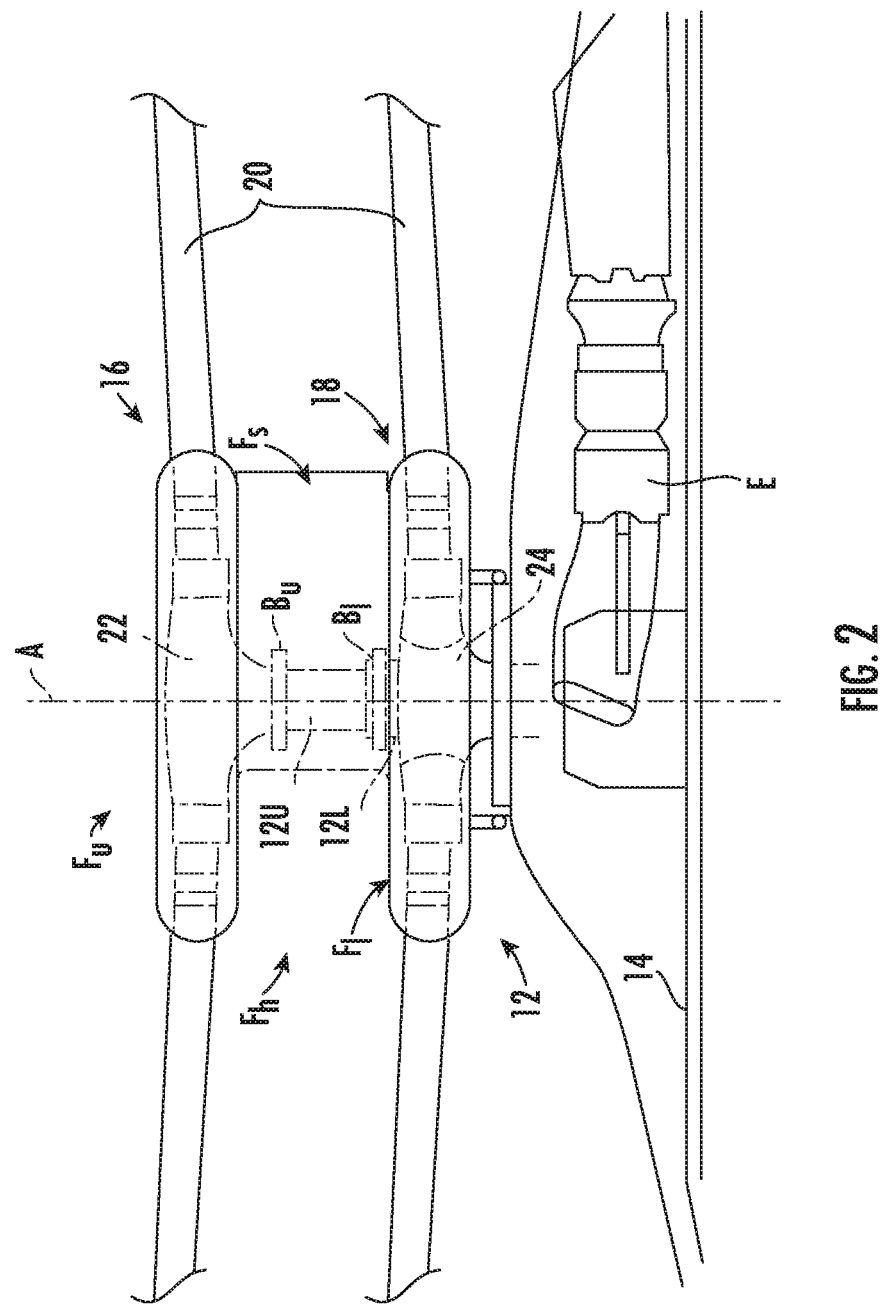
FIG. 2 is a detailed view of a rotor system of the rotary wing aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about a rotor axis of rotation A. A plurality of the main rotor blade assemblies 20 project radially outward from the hub assemblies 22, 24. While eight assemblies 20 are shown, it is understood that other numbers of number of main rotor blade assemblies 20 may be used with the rotor system 12.

Figure 3:
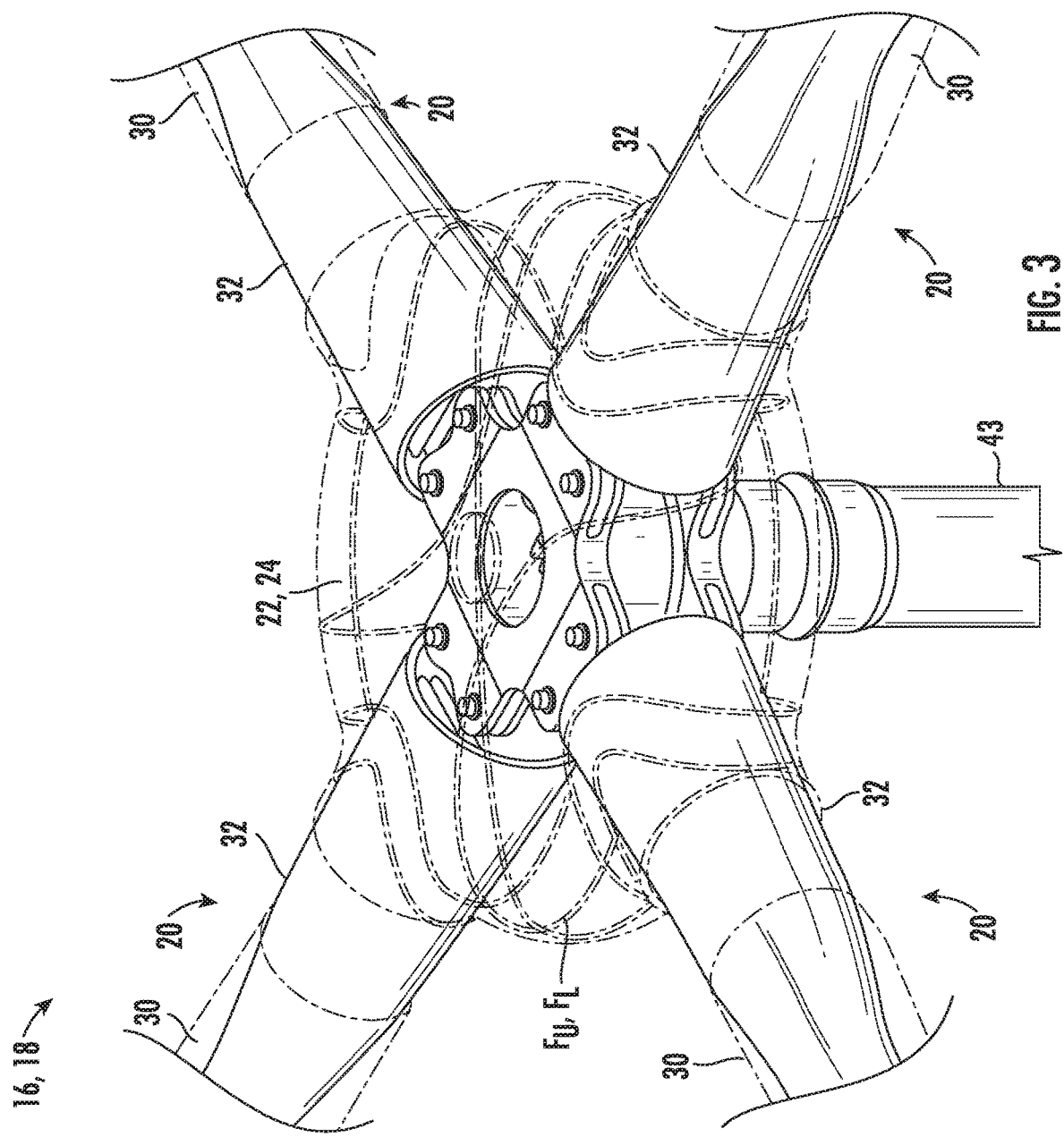
FIG. 3 is a perspective view of a portion of a rotor system in an in-flight position according to an embodiment.
Figure 4:
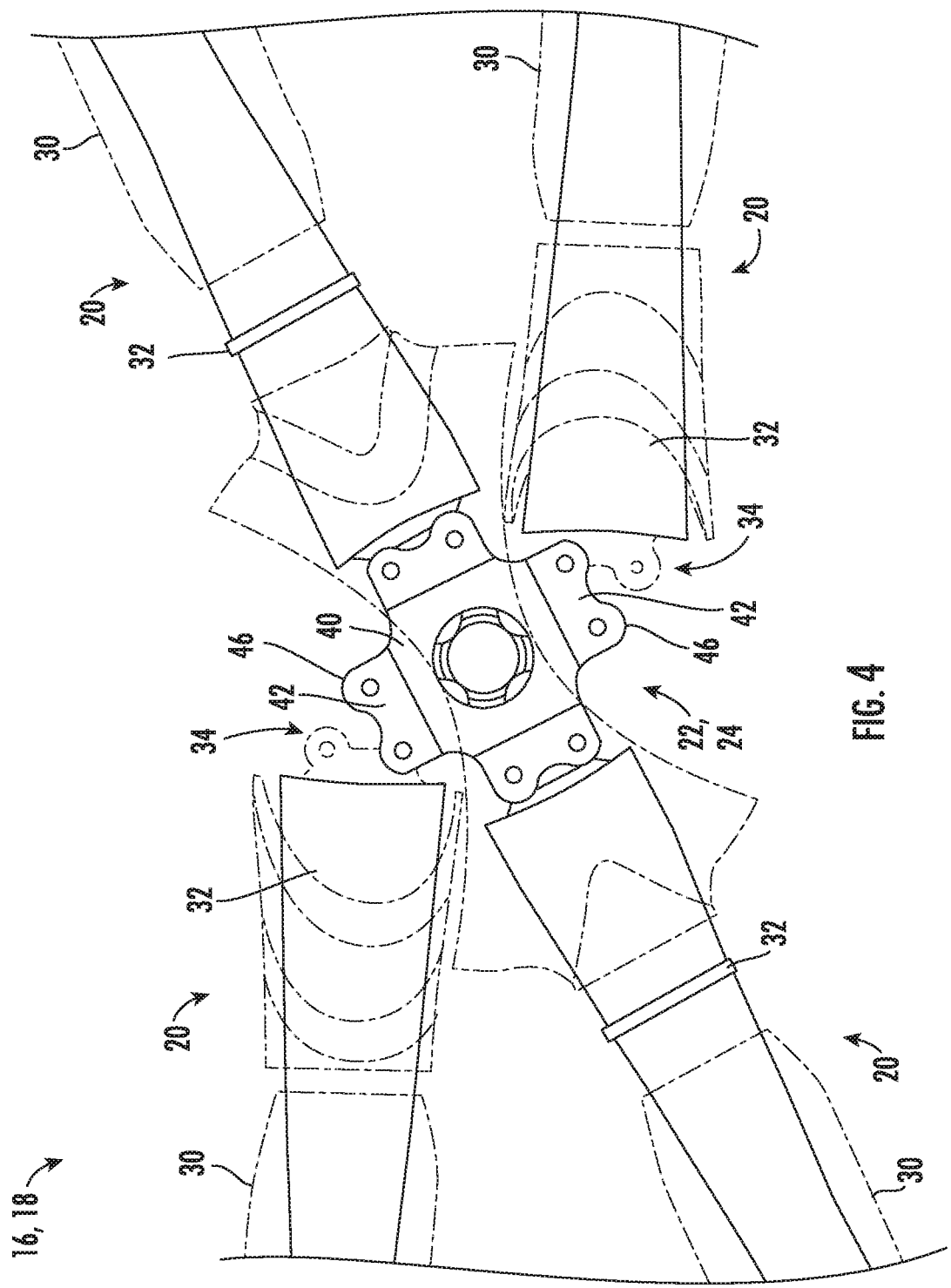
FIG. 4 is a perspective view of a portion of a rotor system in a stowed position according to an embodiment.

Referring now to FIGS. 3 and 4, at least one of the rotor blade assemblies 20 of the rotor system 12 includes a rotor blade 30, a rotor blade torque tube 32, and a blade attachment assembly 34 for mounting the rotor blade assembly 20 to a rotor hub assembly, such as rotor hub assembly 22 or 24 for example. In the illustrated, non-limiting embodiment, the main rotor system 12 is a rigid rotor system. The blade attachment assembly 34, to be described in more detail below, allows for movement of one or more of the rotor blade assemblies 20 relative to the rotor hub assembly 22, 24 between an extended position (FIG. 3) for operation of the aircraft and a collapsed position (FIG. 4) for storage of the aircraft.

Figure 5:
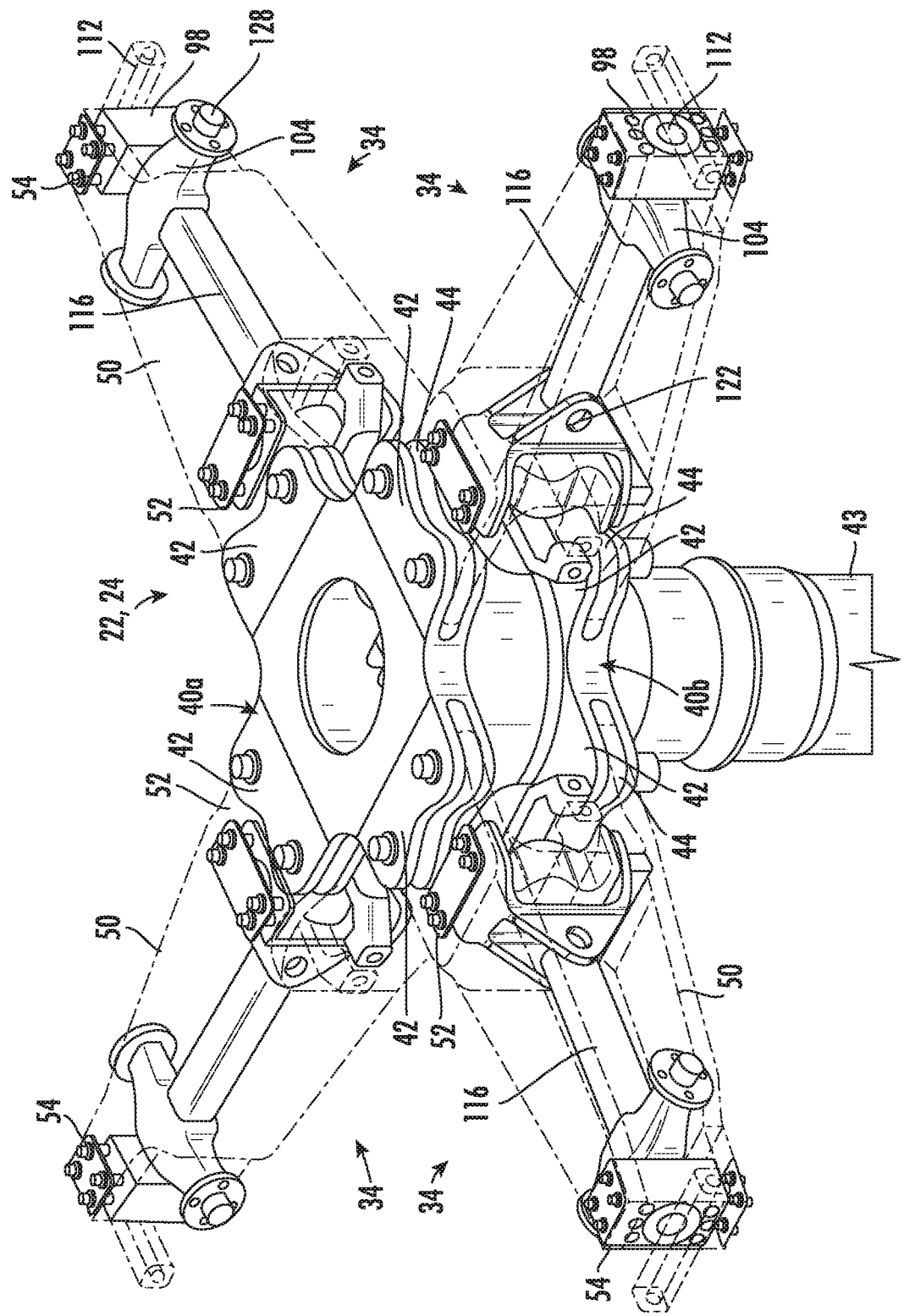
FIG. 5 is a perspective view of a portion of a rotor system in an in-flight position according to an embodiment.
Figure 6:
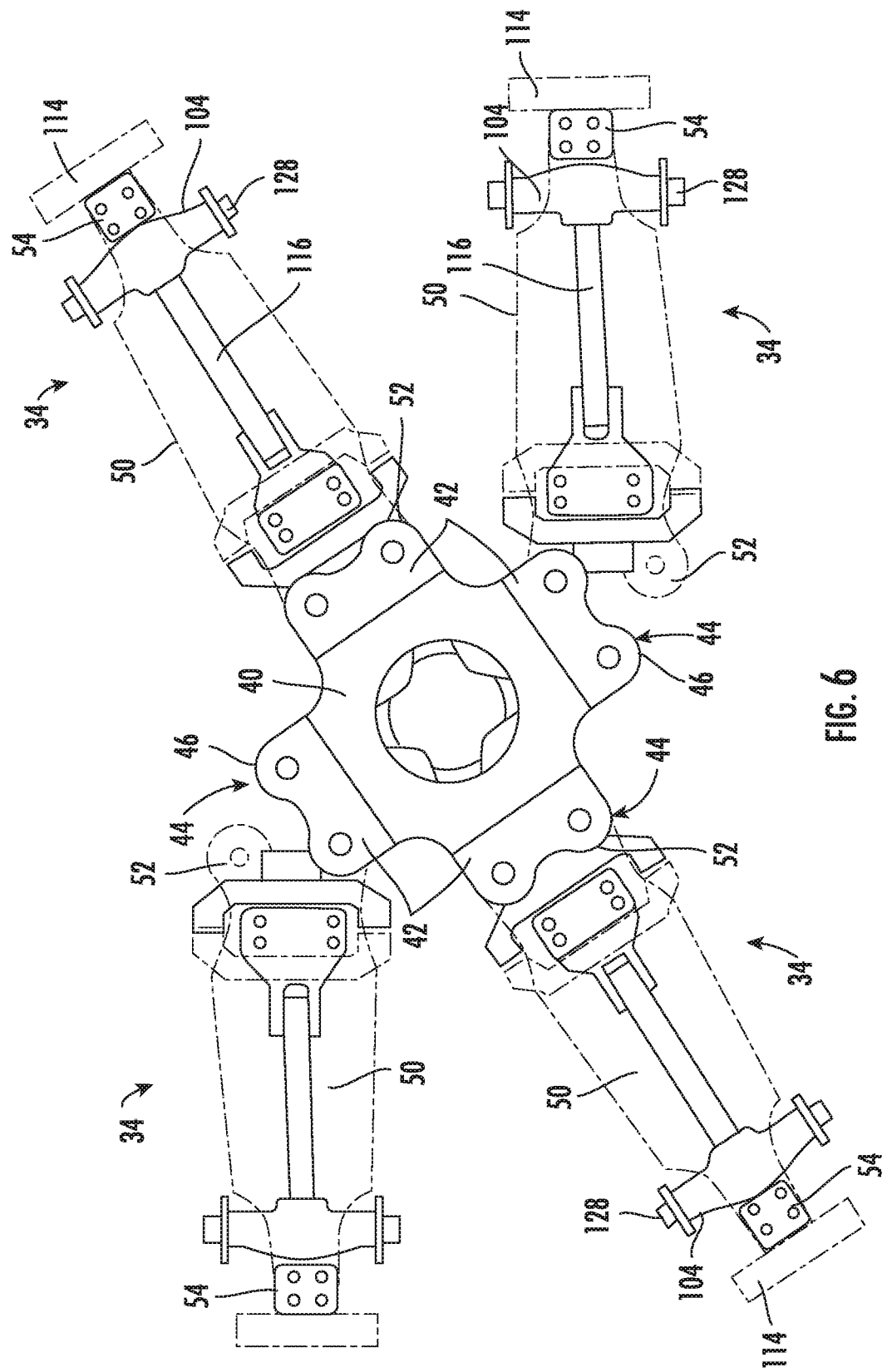
FIG. 6 is a perspective view of the portion of a rotor system of FIG. 5 in a stowed position according to an embodiment.
Figure 7:
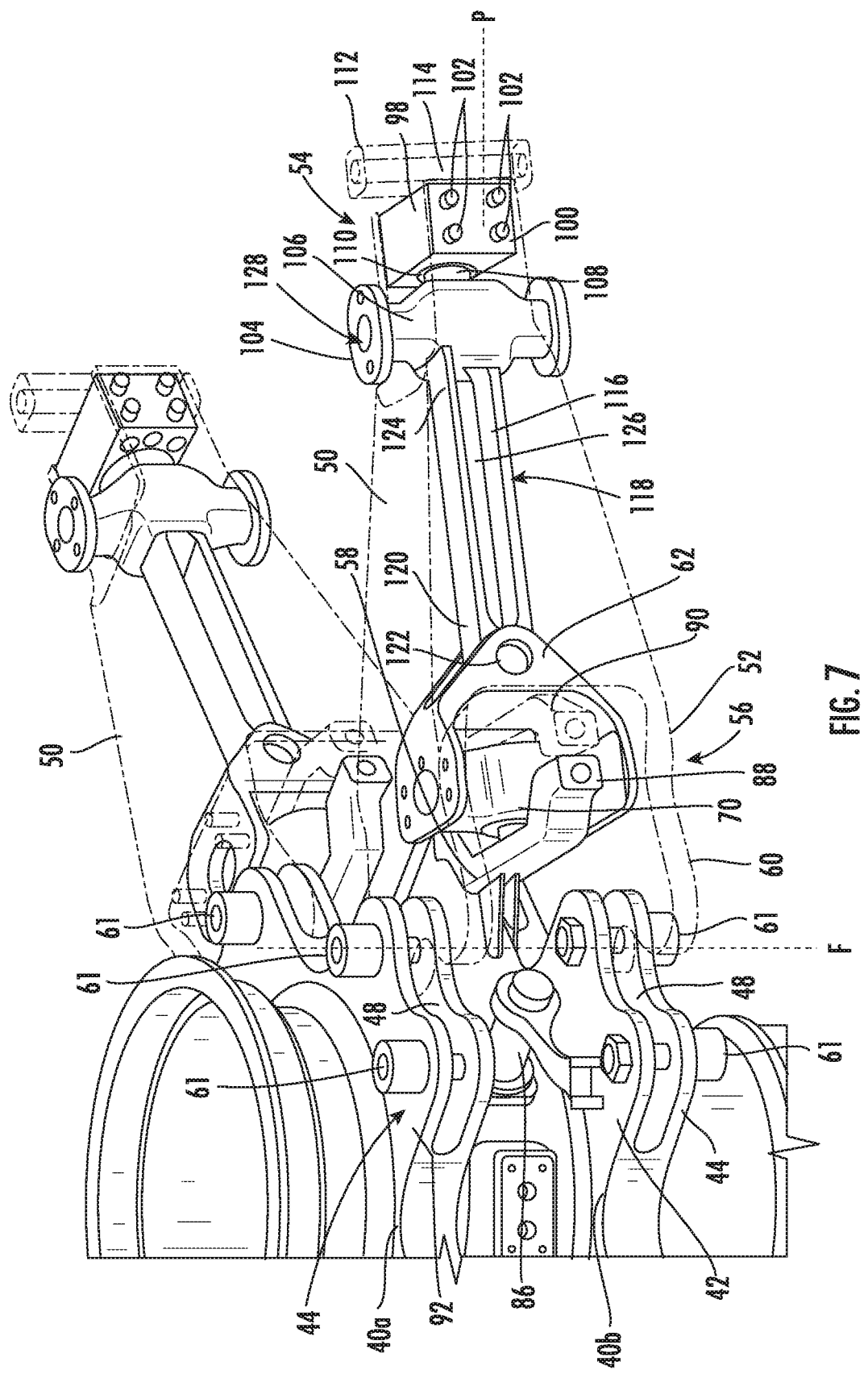
FIG. 7 is a perspective view of a blade attachment assembly of a rotor system in a partially stowed position according to an embodiment.
Figure 8:
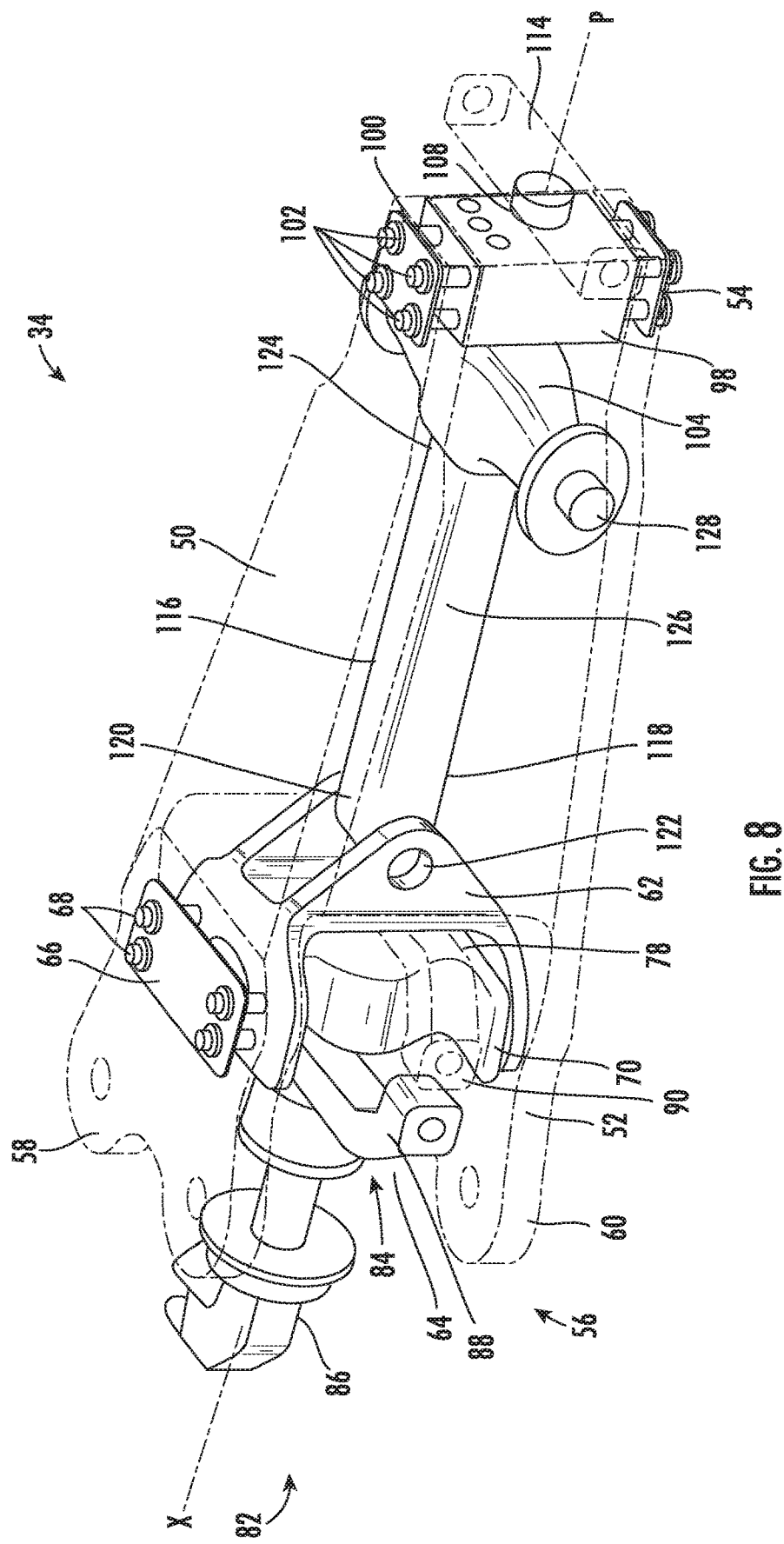
FIG. 8 is a perspective view of a blade attachment assembly of a rotor system according to an embodiment.

As best shown in FIG. 5, a rotor hub assembly, such as either the upper hub assembly 22 or the lower hub assembly 24 for example, is illustrated in more detail. As shown, the rotor hub assembly 22, 24 includes at least one plate 40 mounted to a shaft 43 of the rotor system 12. In the illustrated, non-limiting embodiment, the rotor hub assembly 22, 24 includes an upper plate 40a arranged adjacent a first end of the hub assembly 22, 24 and a lower plate 40b arranged adjacent a second, opposite end of the rotor hub assembly 22, 24. However, embodiments where the rotor hub assembly 22, 24 includes only one of the upper plate 40a and lower plate 40b are also within the scope of the disclosure. The one or more plates 40a, 40b of the rotor hub assembly 22, 24 include a plurality of hub arms 42 extending radially outwardly from the rotor axis A. A configuration of each of the plurality of hub arms 42 may be substantially identical, or alternatively, may vary.

A rotor blade assembly 20 is mountable to each of the plurality of hub arms 42. In the illustrated embodiment, each of the plurality of hub arms 42 includes a blade clevis 44 which is located at the distal end 46 of each hub arm 42. In such embodiments, a portion of the rotor blade assembly 20 is received within the central opening 48 of the blade clevis 44. Further, in embodiments where the rotor hub assembly 22, 24 includes an upper plate 40a and a lower plate 40b, each hub arm 42 and blade clevis 44 of the upper plate 40a may be aligned with a hub arm 42 and blade clevis 44 of the lower plate 40b.

One or more of the rotor blade assemblies 20 includes a blade attachment assembly 34 for mounting the rotor blade assembly 20 to the rotor hub assembly 22, 24 such that the rotor blade assembly 20 is configured to fold about a blade fold axis F arranged generally perpendicular to the blade chord. With reference now to FIGS. 5-9, an example of a blade attachment assembly 34 is illustrated in more detail according to an embodiment. As shown, the blade attachment assembly 34 includes a rigid hub extender 50 having a first, inboard end 52 and a second, outboard end 54. The first end 52 of the hub extender 50 is configured to mount to the rotor hub assembly 22, 24.

A clevis 56 having at least one of an upper portion 58 and a lower portion 60 (best shown in FIG. 7) may be formed at the inboard end 52 of the hub extender 50. In the illustrated, non-limiting embodiment, the upper portion 58 is receivable within the opening 48 of a blade clevis 44 of a hub arm 42 of the upper plate 40a and the lower portion 60 is receivable within the opening 48 of a corresponding blade clevis 44 of a hub arm 42 of the lower plate 40b. In an embodiment, a plurality of aligned openings are formed in the upper and lower portions 58, 60 of the clevis 56 and the upper and lower plates 40a, 40b of the rotor hub assembly 22, 24. Accordingly, a pin 61 extends through each set of aligned openings to couple the hub extender 50 to the rotor hub assembly 22, 24 and define a blade fold axis F.

The hub extender 50 may be formed from any suitable material, including but not limited to a composite material, steel, and titanium for example. In the illustrated, non-limiting embodiment, the hub extender 50 has a generally rectangular cross-section that varies in size over the pitch axis of rotor blade assembly 20, for example the cross-sectional area may gradually reduce along the longitudinal axis of the rotor blade assembly 20, extending from the inboard end 52 to the outboard end 54. However, the hub extender 50 is not limited to having a rectangular cross-section in various embodiments.

Figure 9:
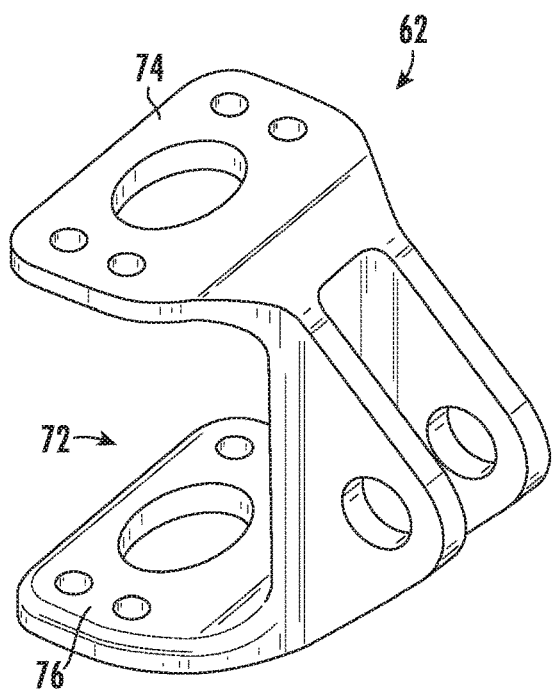
FIG. 9 is a perspective view of an anchor of a blade attachment assembly according to an embodiment.

A clevis-shaped anchor or mounting bracket 62, best shown in FIG. 9, is disposed within the interior 64 of the hub extender 50 adjacent the first inboard end 52 thereof. In the illustrated, non-limiting embodiment, the anchor 62 is affixed to the hub extender 50 via one or more clamping plates 66 positioned adjacent an exterior of the hub extender 50 and/or a plurality of fasteners 68. However, it should be understood that embodiments where the clamping plate and/or fasteners are located within the interior of the hub extender are also within the scope of the disclosure. Further, embodiments where the anchor 62 is mounted to the hub extender 50 via any other suitable mechanism are also contemplated herein.

An inboard bearing 70 is positioned within the clearance 72 defined between a first arm 74 and the second arm 76 of the anchor 62. As shown, the inboard bearing 70 may include a body 78 and a flange 80 extending perpendicularly to the body 78 at the first and second ends thereof, respectively, such that the inboard bearing 70 has an I-like configuration. Each of flanges 80 may abut the first arm 74 and the second arm 76 of the anchor 62, respectively and is coupled to the anchor 62 and the hub extender 50 via the plurality of fasteners 68. The blade folding axis F defined by the pin 61, is located inboard of the anchor 62 and the inboard bearing 70.

A pitch control assembly 82 includes a teeter bar 84 mounted for rotation with the rotor blade torque tube 32 about a blade pitch axis P. A horn mount 86 is rotationally mounted to the rotor hub assembly 22, 24 for rotation about a hub spindle pitch axis X. The hub spindle pitch axis X is in line with the pitch blade axis P when the rotor blade assembly 20 is in the flight position and is unaligned with the pitch blade axis P when the rotor blade assembly 20 is folded.

Figure 10:
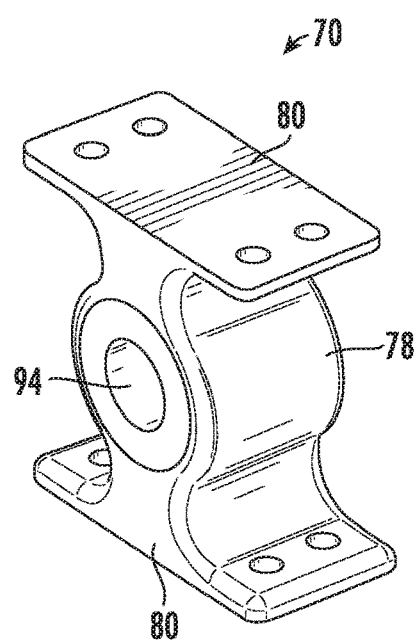
FIG. 10 is a perspective view of an inboard bearing of a blade attachment assembly according to an embodiment.
Figure 11:
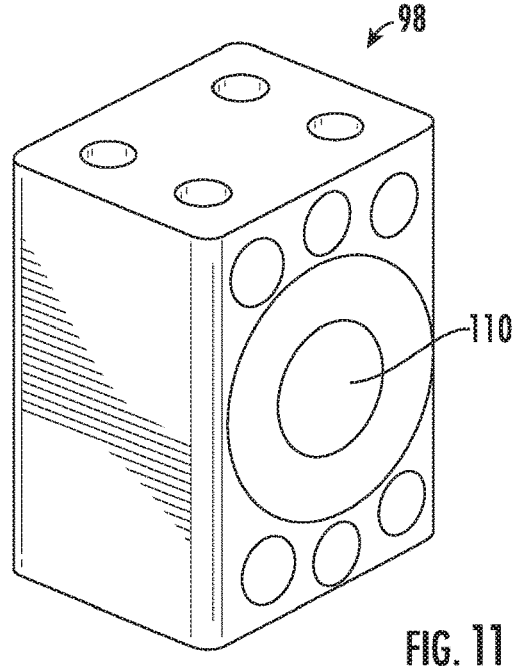
FIG. 11 is a perspective view of an outboard bearing of a blade attachment assembly according to an embodiment.
Figure 12:
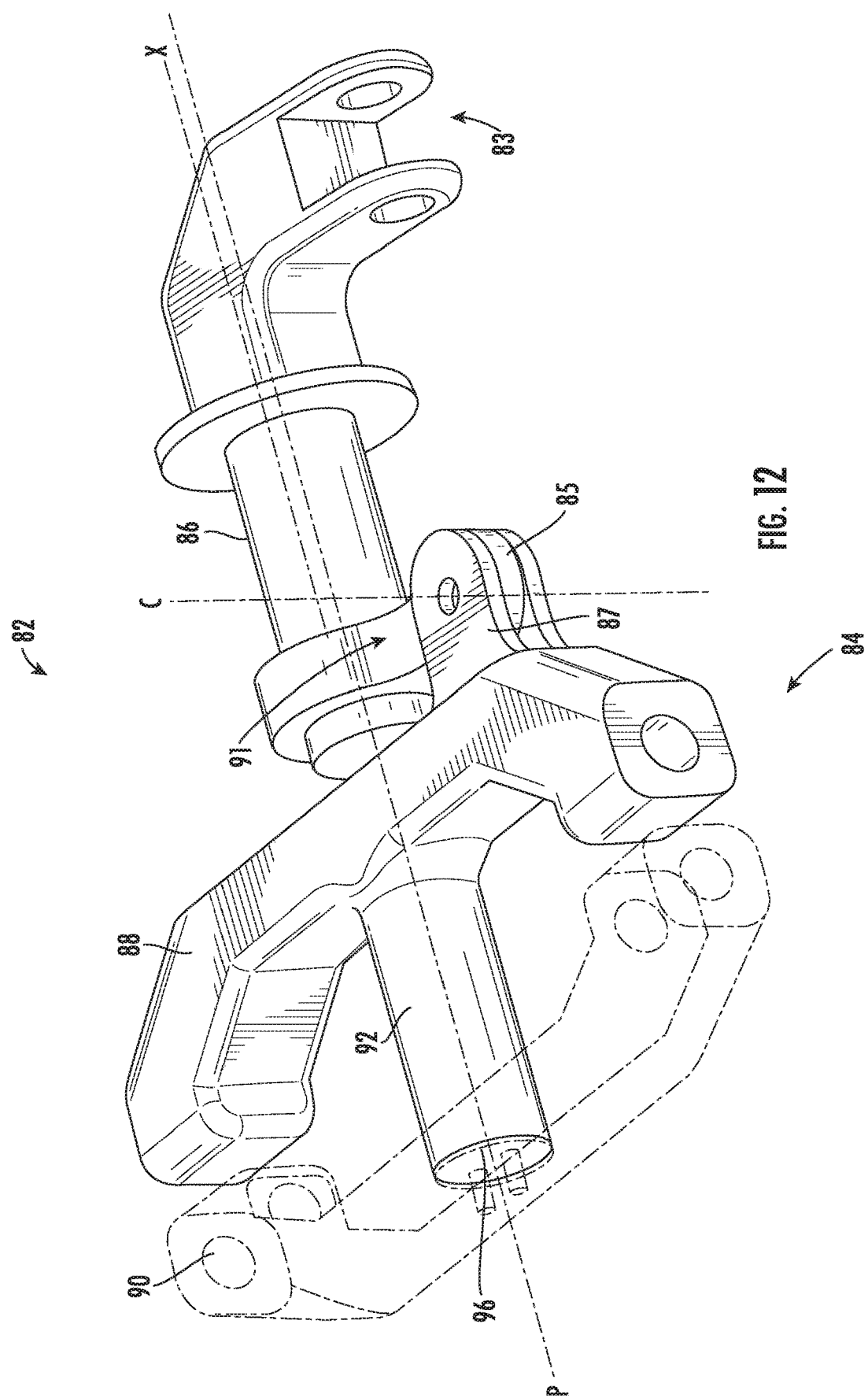
FIG. 12 shows a close-up view of a pitch control assembly for the upper rotor system.

FIG. 12 shows a close-up view of a pitch control assembly 82 for the upper rotor system 16 shown in FIGS. 2 through 8. The pitch control assembly 82 includes the horn mount 86 and the teeter bar 84. The teeter bar 84 includes a horn extender 88 and an outboard portion 90. The horn extender 88 has a C-like shape that surrounds a first side of the inboard bearing 70. In the illustrated, non-limiting embodiment, a connector 92 extends perpendicularly from the horn extender 88 coaxial with the blade pitch axis P. The connector 92 is receivable within a central opening 94 formed in the body 78 of the inboard bearing 70 shown in FIG. 10. The outboard portion 90 of the teeter bar 84 is connectable to the distal or free end 96 of the connector 92 extending beyond the adjacent inboard bearing 70. The horn mount 86 is hingedly attached to the horn extender 88 at an interface 91 and include an inboard connection section 83 for connecting to the main rotor hub. In the flight-ready configuration shown in FIG. 12, the blade pitch axis P is aligned with the hub spindle pitch axis X. In various embodiments, the horn mount 86 and outboard portion 90 are made of Titanium or a Titanium alloy and the horn extender 88 can be made of steel.

The horn extender 88 of the teeter bar 84 engages the horn mount 86 at an interface 91. The interface 91 includes a clevis 87 of the horn extender 88 and a tang 85 of the horn mount 86. The clevis 87 is located at a radially inward end of the horn extender 88 to a side of the blade pitch axis P. Similarly, the tang 85 is located to a side of the hub spindle pitch axis X. The tang 85 is inserted into the clevis 87 and a bolt or other connection device passes through holes in the clevis 87 and tang 85 in order to secure the tang 85 to the clevis 87, forming the hinged interface 91. The interface 91 defines a pitch control fold axis C for the pitch control assembly 82 as shown in FIG. 12. The interface 91 allows for a rotation of the horn mount 86 about the hub spindle pitch axis X to be transmitted across the interface 91 to cause a rotation of the teeter bar 84, the blade pitch control coupling 82, the rotor blade torque tube 32, and the attached rotor blade 30 about the blade pitch axis P.

Rotation of the horn mount 86 and horn extender 88 about the blade pitch axis changes the angle between the blade fold axis F and pitch control fold axis C. When in a neutral position ready for blade folding, the blade fold axis F and pitch control fold axis C are both parallel and collinear or substantially collinear. In other words, the location of the clevis 87 on the horn extender 85 is selected such that, when the blade pitch control coupling 82 is in a position for blade folding, then the pitch control fold axis C is aligned with the blade fold axis F of the rotor blade assembly 20. Therefore, when the rotor blade assembly 20 is folded about the blade fold axis F, the blade pitch control coupling 82 folds about the pitch control fold axis C along with the rest of the rotor blade assembly 20. The rotor blade assembly 20 and pitch control assembly 82 therefore rotate through the same angle. This folding leaves the pitch control assembly 82 intact. Thus, when the rotor blade assembly 20 is unfolded or placed back into a positon for flight, the pitch control assembly 82 does not need to be reassembled.

Figure 13:
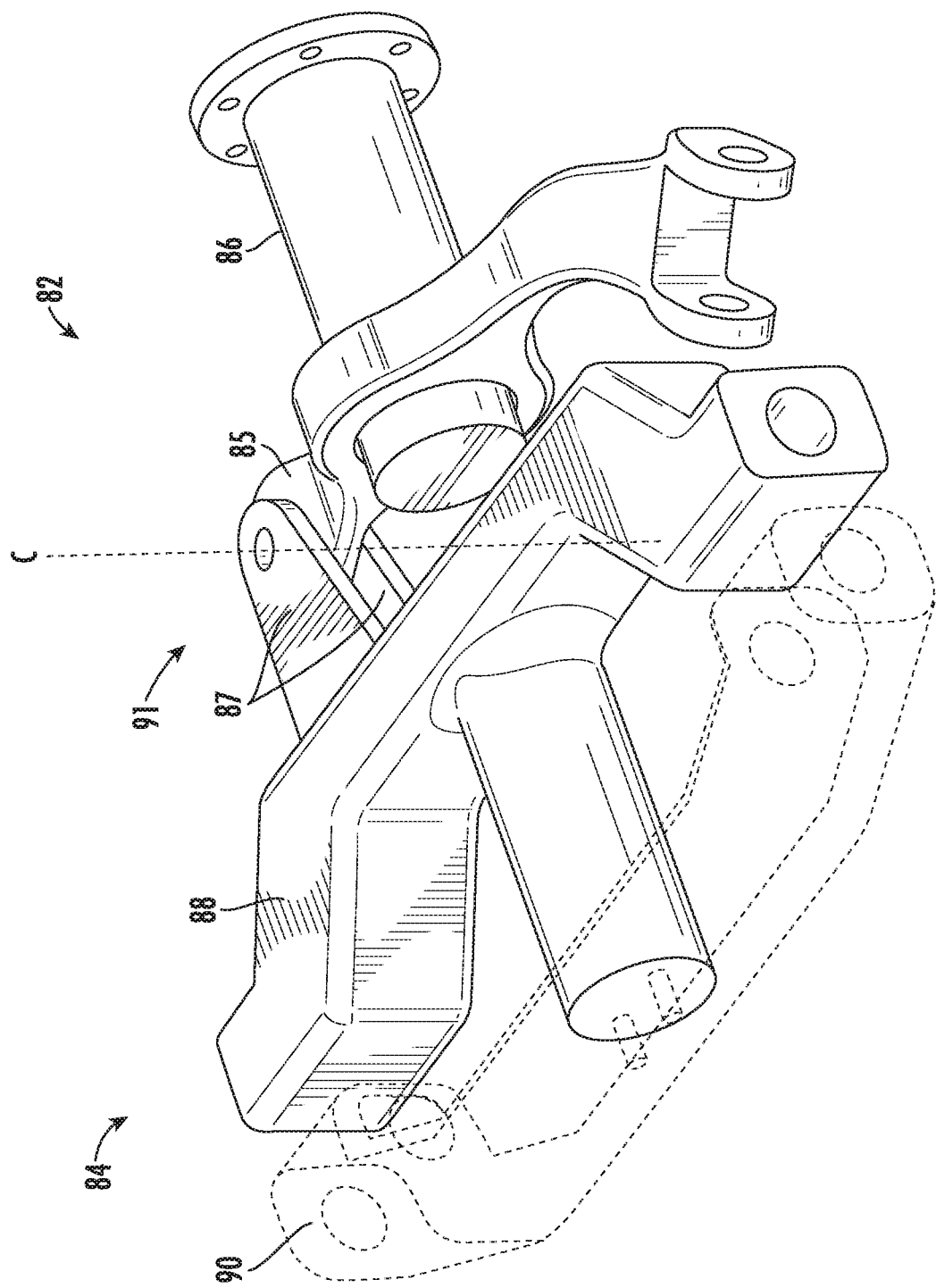
FIG. 13 shows a close-up view of a pitch control assembly for the lower rotor system

FIG. 13 shows a close-up view of a pitch control assembly 82 for the lower rotor system 18. The horn mount 86 and the teeter bar 84, including horn extender 88 and outboard portion 90, are shown. The horn mount 86 connects to the lower hub assembly 24 at its inboard end and is hingedly attached to the horn extender 88 at an interface 91 at its outboard end. FIG. 13 shows the pitch control assembly 82 in a flight-ready configuration.

Similar to the pitch control assembly 82 of the upper rotor system 16, the horn extender 88 engages the horn mount 86 at interface 91, including a clevis 87 of the horn extender 88 and a tang 85 of the horn mount 86, which are secured to each other to define a pitch control fold axis C. Rotation of the horn mount 86 about the hub spindle pitch axis X produces a rotation of the teeter bar 84 about the blade pitch axis P via the interface 91, thereby producing a pitch at the rotor blade 30.

Rotation of the horn mount 86 and horn extender 88 about the blade pitch axis changes the angle between the blade fold axis F and pitch control fold axis C. When in a neutral position ready for blade folding, the blade fold axis F and pitch control fold axis are both parallel and collinear or substantially collinear. In other words, the location of the clevis 87 on the horn extender 85 is selected such that, when the blade pitch control coupling 82 is in a position for blade folding, then the pitch control fold axis C is aligned with the blade fold axis F of the rotor blade assembly 20. Therefore, when the lower rotor assembly 20 is folded about the blade fold axis F, the pitch control assembly 82 of the lower rotor system 18 folds about the pitch control fold axis C. The lower rotor assembly 20 and pitch control assembly 82 therefore rotate through the same angle. This folding leaves the pitch control assembly 82 intact. Thus, when the rotor blade assembly 20 is unfolded or placed back into positon for flight, the pitch control assembly 82 does not need to be reassembled.

Referring back to FIGS. 5-9, because the horn extender 88 and outboard portion 90 of the teeter bar 84 are disposed on opposing sides of the inboard bearing 70, translation of the blade pitch control coupling 84 relative to the inboard bearing 70 and the hub extender 50 is restricted. However, the teeter bar 84 is rotatable about the pitch axis P relative to the inboard bearing 70 and the hub extender 50. The end points of the allowable rotation are defined by engagement between the teeter bar 84 and an adjacent wall of the hub extender 50. As shown, the blade folding axis F defined by the pin 61, is also located inboard of the blade pitch control coupling 84.

An outboard bearing 98 is similarly disposed within the hub extender 50 adjacent the distal or outboard end 54 thereof. In the illustrated, non-limiting embodiment, the outboard bearing 98 is affixed to the hub extender 50 via one or more clamping plates 100 positioned adjacent a surface of the hub extender 50 and/or a plurality of fasteners 102. The blade attachment assembly 34 additionally includes an outboard bearing bracket 104 arranged generally inboard of the outboard bearing 98. As shown, the outboard bearing bracket 104 includes a body 106 oriented generally perpendicular to the pitch axis P of the rotor blade assembly 20. In an embodiment, the body 106 is sized such that at least one of the ends thereof, and in the illustrated embodiments, opposing ends of the body 106 are located external to the hub extender 50.

Extending perpendicularly from an outboard side of the body 106, generally coaxial with the pitch axis P of the rotor blade assembly 20, is a connector 108. As shown, the connector 108 may be cylindrical in shape. However, it should be understood that a connector 108 having any configuration is within the scope of the disclosure. The connector 108 is receivable within a central opening 110 formed in the outboard bearing 98. An affixing member 112 is coupled to a free end 114 of the connector 108 extending beyond the outboard bearing 98, such as with one or more fasteners for example.

Because the affixing member 112 and the body 106 of the outboard bearing bracket 104 are disposed on opposing sides of the outboard bearing 98, translation of the outboard bearing bracket 104 away from the outboard bearing 98 is restricted. However, the outboard bearing bracket 104 is rotatable about the pitch axis relative to the outboard bearing 98 and the hub extender 50. The end points of the allowable rotation are defined by engagement between the body of the outboard bearing bracket 104 and a wall of the hub extender 50.

The rotor blade assembly 20 additionally includes a tension torsion strap 116 having an elongate body 118 with arcuate or curved opposing ends 120, 122. The tension torsion strap 116 may be formed of any suitable material, such as steel or Kevlar™ for example. An opening 126 may be located at a center of the elongate body 118 to reduce the material, and therefore weight, of the tension torsion strap 116. A fibrous material may extend along the elongate body 118 parallel to the longitudinal axis of the elongate body 118. The tension torsion strap 116 is arranged within the interior 64 of the hub extender 50. In the illustrated, non-limiting embodiment, the tension torsion strap 116 is positioned such that an axis defined by the opening 126 is oriented horizontally, in a substantially perpendicular configuration relative to the pitch axis P of the rotor blade assembly 20 and the hub extender 50.

In the illustrated, non-limiting embodiment, a first end 120 of the tension torsion strap 116 is connected to a portion of the anchor 62, such as via a pin or other suitable fastener 122. Similarly, a second, opposite end 124 of the tension torsion strap 116 is received within an opening 126 formed in the outboard bearing bracket 104. In an embodiment, a pin or other fastener 128 extending through the body 106 of the outboard bearing bracket 104 couples the tension torsion strap 116 to the outboard bearing bracket 104. As a result of this configuration, translational movement of the tension torsion strap 116 along the pitch axis P is restricted by anchor 62 and outboard bearing bracket 104.

The blade attachment assembly 34 illustrated and described provides high stiffness in lead/lag, flap, and torsion directions. The blade attachment assembly 34 additionally minimizes the misalignment between the inboard and outboard bearings. The bolt 61 allows the blade to fold at its inboard end, while the outboard end of the attachment is carried effectively as in plane shear. The blade attachment assembly 34 further reduces the height and drag of the rotor blade.

With reference again to FIG. 4, as shown, one or more openings may be formed in the rotor hub fairing, such as fairing $F_U$ or $F_L$ for example, to accommodate the folding motion of one or more rotor blade assemblies coupled thereto. The arcuate shaped openings or cut away sections avoid interference with the rotor blade assemblies as they pivot about the blade fold axis. In the illustrated, non-limiting embodiment, the rotor hub assembly 22, 24 has four rotor blade assemblies 30, and two opposing rotor blade assemblies 30.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor blade assembly of an aircraft, comprising:
   a rotor blade;
   a blade attachment assembly attachable to the rotor blade and rotatable with respect to a rotor hub assembly of the aircraft about a blade fold axis; and
   a pitch control assembly including:
      a horn mount attachable to the rotor hub assembly; and
      a teeter bar hingedly attached to the horn mount at an interface, the interface defining a pitch control fold axis, the teeter bar mechanically coupled to the blade attachment assembly to adjust a pitch of the rotor blade;

wherein the pitch control assembly is foldable about the pitch control fold axis when the pitch control fold axis is aligned with the blade fold axis.

2. The rotor blade assembly of claim 1, wherein the pitch control assembly is foldable about the pitch control fold axis when the pitch control fold axis is collinear with the blade fold axis.

3. The rotor blade assembly of claim 1, wherein the pitch control assembly is foldable by rotating the teeter bar with respect to the horn mount about the pitch control fold axis.

4. The rotor blade assembly of claim 1, wherein the horn mount and the teeter bar remain coupled when the rotor blade assembly is folded.

5. The rotor blade assembly of claim 1, wherein the blade attachment assembly and pitch control assembly rotate through the same angle to fold the rotor blade assembly.

6. The rotor blade assembly of claim 1, wherein the pitch control assembly is rotatable about a pitch control axis to align the pitch control fold axis with the blade fold axis.

7. The rotor blade assembly of claim 1, wherein the interface includes a clevis of the teeter bar coupled to a tang of the horn mount.

8. The rotor blade assembly of claim 7, wherein the teeter bar includes a horn extender coupled to an outboard portion, the horn extender including the clevis.

9. The rotor blade assembly of claim 8, wherein the pitch control assembly further includes a bearing, the horn extender coupling to the outboard portion via a connector that extends from the horn extender through a central opening of the bearing.

10. A pitch control assembly for a rotor blade assembly which is rotatable with respect to a rotor hub assembly at a blade fold axis, the pitch control assembly comprising:
a horn mount attachable to the rotor hub assembly of the aircraft; and
a teeter bar hingedly attached to the horn mount at an interface, the interface defining a pitch control fold axis;
wherein the pitch control assembly is foldable about the pitch control fold axis when the pitch control fold axis is aligned with the blade fold axis.

11. The pitch control assembly of claim 10, wherein the pitch control assembly is foldable about the pitch control fold axis when the pitch control fold axis is collinear with the blade fold axis.

12. The pitch control assembly of claim 10, wherein the pitch control assembly is foldable by rotating the teeter bar with respect to the horn mount about the pitch control fold axis.

13. The pitch control assembly of claim 10, wherein the horn mount and the teeter bar remain coupled when the blade is folded.

14. The pitch control assembly of claim 10, wherein the pitch control assembly is rotatable about a pitch control axis to align the pitch control fold axis with the blade fold axis.

15. The pitch control assembly of claim 10, wherein the interface includes a clevis of the teeter bar coupled to a tang of the horn mount.

16. The pitch control assembly of claim 15, wherein the teeter bar includes a horn extender coupled to an outboard portion, the horn extender including the clevis.

17. The pitch control assembly of claim 14 further including a bearing, wherein the horn extender couples to the outboard portion via a connector that extends from the horn extender through a central opening of the bearing.

18. The pitch control assembly of claim 15, wherein the outboard portion is mechanically coupled to a blade attachment assembly to control a pitch of a rotor blade.

19. A coaxial aircraft including the rotor blade assembly of claim 1.

* * * * *